United States Patent [19]

Strazewski

[11] 4,184,011
[45] Jan. 15, 1980

[54] BATTERY REFILL INDICATOR

[76] Inventor: Edward R. Strazewski, c/o Electro-Hite Co., P.O. Box 187, Cedarburg, Wis. 53012

[21] Appl. No.: 903,757

[22] Filed: May 8, 1978

[51] Int. Cl.² .................... H01M 10/48; G01F 23/00
[52] U.S. Cl. ........................................ 429/91; 73/309; 73/322; 73/322.5
[58] Field of Search ................ 429/91, 90; 73/290 R, 73/305, 306, 319, 322, 322.5, 309, 311, 122

[56] References Cited
U.S. PATENT DOCUMENTS

| | | | |
|---|---|---|---|
| 1,260,934 | 3/1918 | Moore | 429/91 X |
| 1,491,143 | 4/1924 | Kerr | 429/91 X |
| 1,703,233 | 2/1929 | Hall et al. | 429/91 |
| 2,590,960 | 4/1952 | Gray | 429/91 |
| 3,218,858 | 11/1965 | Van Woert | 73/306 |
| 3,673,587 | 6/1972 | Baruch | 73/322.5 X |

Primary Examiner—Anthony Skapars
Attorney, Agent, or Firm—Ronald E. Barry

[57] ABSTRACT

A battery refill indicator including a cap having a screw type base and an enlarged cover including a central opening and a float-type liquid level indicator supported by said cap and including a stem extending outwardly through said central opening in said cap and a float connected to the stem in a position to be suspended within the electrolyte in the battery cell. The stem is limited in its upward travel to a height less than the height of the battery cables and the float is adapted to be adjusted in length to accomodate different size batteries. A guide disc is provided in the cap which limits the upward travel of the indicator and also acts as a splash guard.

6 Claims, 6 Drawing Figures

BATTERY REFILL INDICATOR

BACKGROUND OF THE INVENTION

It is generally well known that the life of a battery can be drastically reduced by failure to maintain the proper water level in the battery cell. This maintenance oversight is generally the result of an inability of the serviceman to readily observe the level of the electrolyte in the battery without removal of the cap. Overfilling of the battery cell can also cut cell capacity and cause corrosion of the battery. On the other hand, underfilling reduces the cell capacity, causes excessive heating and charging and can permanently damage a battery cell. Since each cell is independent proper maintenance requires removal of each cap in order to observe the electrolyte level within the cell.

SUMMARY OF THE INVENTION

The battery refill indicator of the present invention is a simple device which solves the problem of water control in industrial batteries. The indicator works on a float principle and thus provides a visual indication of the electrolyte level in each cell of the battery at all times. Since each cell is separate, only those cells are filled which are visually indicated as not properly filled.

The indicator is also provided with a predetermined amount of vertical travel which is related to the diameter of the battery cables. This avoids cable interference and battery tray cover interference. Dust guards and splash guards have also been provided in the indicator cap which also preserve the life of the battery.

DRAWINGS

DESCRIPTION OF THE INVENTION

Figure 1:
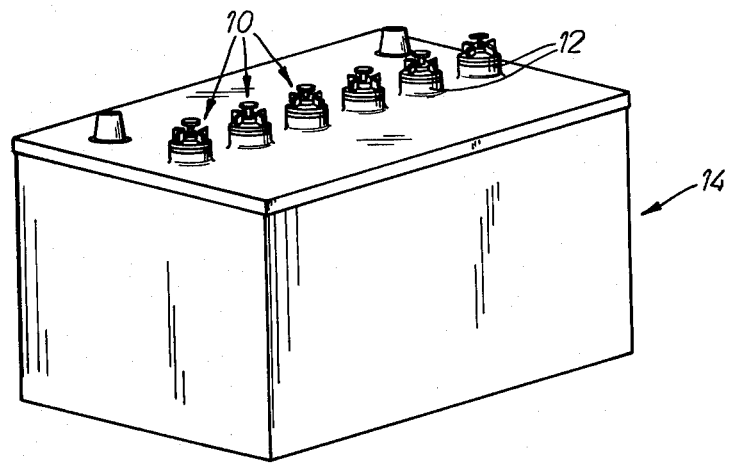
FIG. 1 is a perspective view of an industrial battery showing the location of the battery refill indicators of the present invention.
Figure 2:
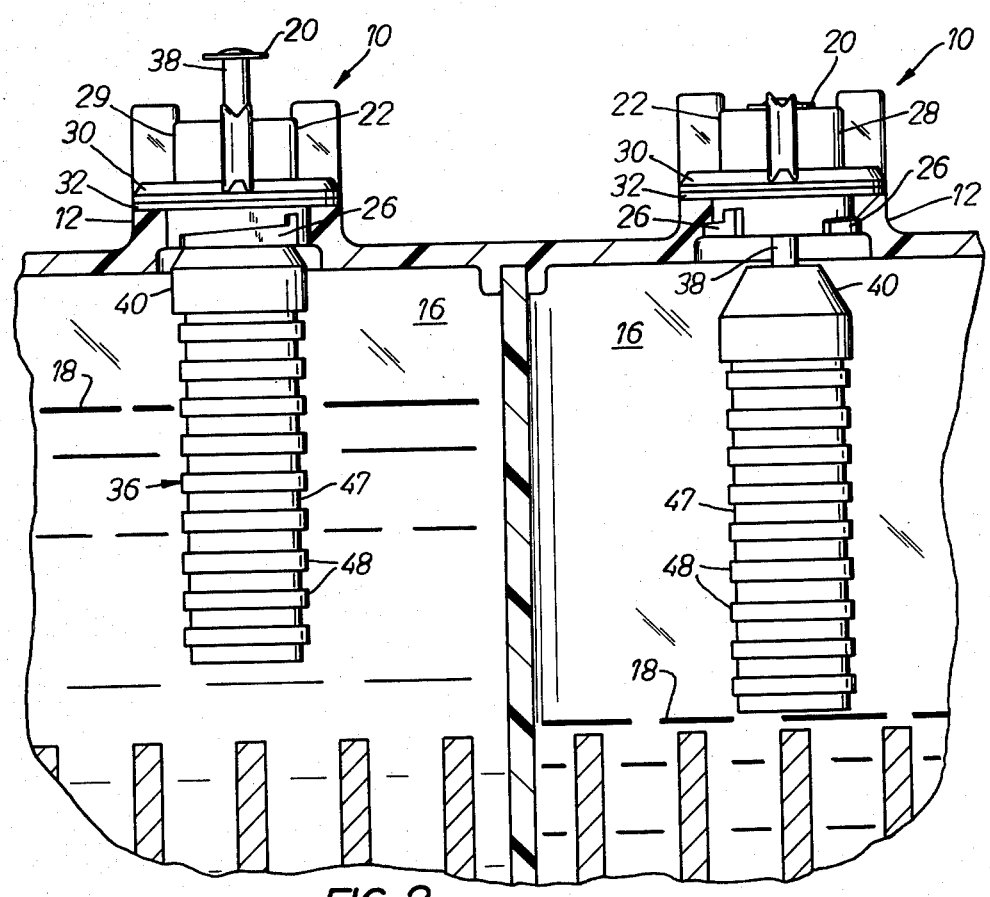
FIG. 2 is a cross sectional view of a portion of the battery of FIG. 1 showing the battery refill indicators in two of the cells.

As seen in the drawings, the battery refill indicators 10 are shown mounted in the vent openings 12 in an industrial battery 14. As is generally understood, a vent opening is provided in each of the cells of the battery. Referring to FIG. 2 the bttery refill indicators 10 are shown mounted in two separate cells 16 of the battery 14. The battery cell 16 on the left in FIG. 2 is shown having the proper level of electrolyte 18 in the cell with the indicator button 20 elevated to show the proper level of electrolyte. In the battery cell 16 on the right in FIG. 2, the electrolyte 18 is shown at a low level with the indicator button 20 resting on the cap 22 of the indicator thus indicating an improper electrolyte level in the battery cell.

Figure 4:
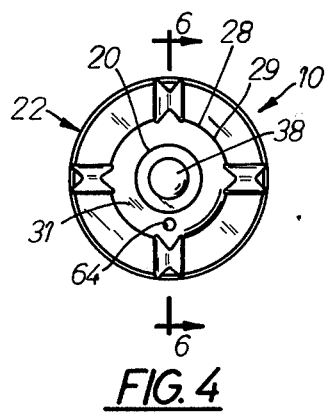
FIG. 4 is a top view of FIG. 3.
Figure 3:
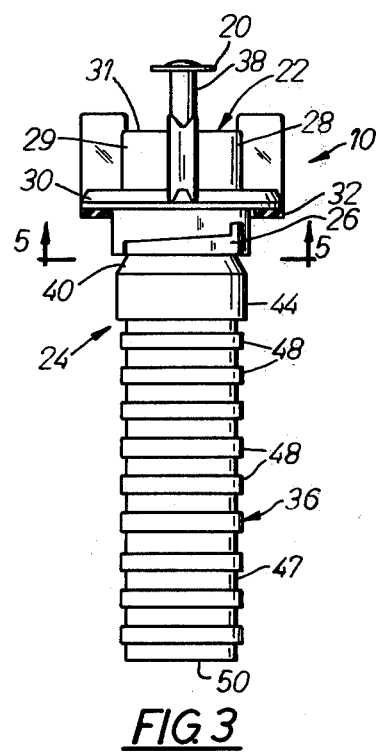
FIG. 3 is a view of the battery refill indicator.
Figure 5:
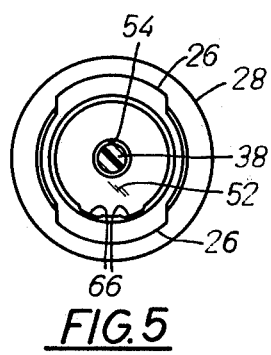
FIG. 5 is a view taken on line 5—5 of FIG. 3 showing the interior of the battery cap.
Figure 6:
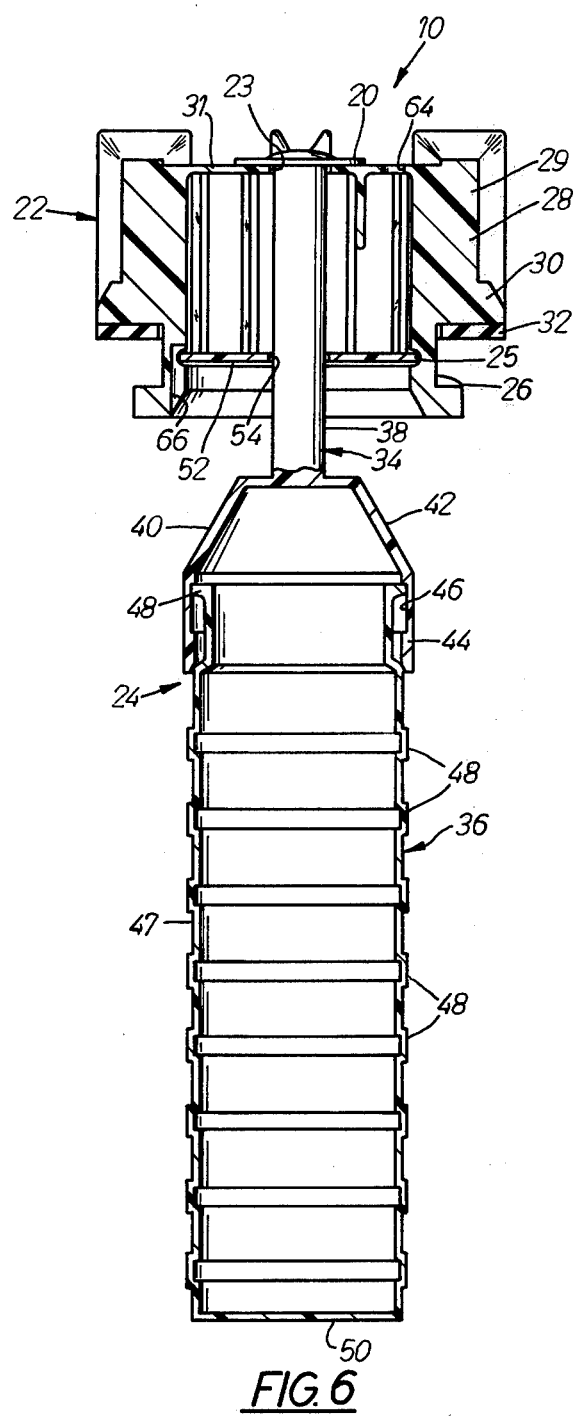
FIG. 6 is a cross section view taken on line 6—6 of FIG. 4 showing an enlarged view of the battery refill indicator.

Referring to FIGS. 3, 4 and 5, the battery refill indicator generally includes the cap 22 and a float assembly 24. The float assembly 24 being supported by the cap 22 for vertical movement in response to changes in electrolyte level.

The cap 22 includes a threaded base portion 26 and an enlarged cap portion 28. The base portion 26 includes an internal groove 25. The cap portion 28 includes a hollow cylindrical section 29 having a cover 31 and a flange 30 around the lower edge of the section 29. An opening 23 is provided in the cover 31. The cap 22 is threadedly turned into the vent opening 12 until the flange 30 is seated on top of the battery. Means can be provided for sealing the cap with respect to the vent opening in the form of a rubber gasket 32.

The float assembly 24 includes an indicator portion 34 and a float portion 36. The indicator portion 34 includes a stem 38 and an enlarged hollow section 40. The stem 38 has a length sufficient to extend through the opening 23 in the cap 22. The enlarged section 40 includes a hollow conical section 42 and an annular flange 44 having an internal groove 46.

The float portion 36 is in the form of a hollow tube 47 having a number of rectangular ribs 48 spaced at intervals throughout the length of the tube 47. The lower end of the tube 47 is closed by means of a wall 50.

The float portion 36 is secured to the indicator portion 34 by inserting the upper rib 48 on the tube 47 into the annular ring 44 until it seats in the groove 46. In this regard it should be noted that the length of the tube 47 can be varied to accommodate different depths of electrolyte in different size cells. This is accomplished by determining the distance between the groove 46 and the proper level for the electrolyte in the cell of the battery. The ribs 48 on the tube 47 are spaced at predetermined intervals. The depth required for the tubes 47 to float in the electrolyte is also known. The number of ribs 48 on the tube are counted from the bottom of the tube 47 until the number of intervals equals distance from the groove 46 to the proper level of electrolyte plus the depth required to float. The upper end of the tube 47 is then cut off with one of the ribs 48 adjacent the top of the tube. The top rib 48 is then inserted into the annular flange 44 of the section 40 until it slots in the groove 46.

Means are provided in the cap 22 to control the upward movement of the indicator and to act as a splash guard within the battery. Such means is in the form of a guide washer 52 having a central aperture 54, the washer 52 being adapted to be seated in the groove 25 provided on the inside surface of the base portion 26 of the cap 22. The stem 38 of the indicator extends through aperture 54 and opening 23.

The indicator is retained in the cap by means of a button 20 which is secured to the end of the stem 38. The button 20 acts as a dust guard to minimize the amount of dust which can pass through the opening 23 into the cap 22.

The cap 22 is vented by means of an aperture 64 provided in the top 31 of the cap and a pair of grooves 66 provided on the inside surface of the base portion 26 of the cap to bypass the washer 52.

The embodiments of the invention in which an exclusive property of privilege is claimed are defined as follows:

1. A battery refill comprising:
   a cap,
   a liquid level indicator supported by said cap, said indicator including means extending above said cap to indicate the proper level of electrolyte in the battery and means responding to the level of the electrolyte in the battery, said cap includes a base portion having a splash guard in the form of a flat washer mounted in the lower portion thereof for controlling the motion of the indicating means whereby the height of the indicating means above the cap indicates whether the proper level of electrolyte is present in the battery.

2. The indicator according to claim 1 wherein said splash guard is located to limit the upward movement of the indicating means to a height less than the height of a battery cable.

3. The indicator according to claim 1 wherein said level responsive means comprises a hollow cylinder closed at one end and having a plurality of ribs on the outer surface thereof, the ribs at the upper end of the hollow cylinder being releasably connected to said indicating means.

4. The indicator according to claim 3 wherein said indicating means includes a stem and a hollow enlarged section having an internal groove, the rib on said hollow cylinder being snapped into said grove.

5. The indicator according to claim 4 wherein said number of ribs on the hollow cylinder is determined by the size of the battery.

6. A battery refill indicator comprising a cap adapted to be mounted in the vent openings of a battery, said cap including an enlarged upper portion having a central opening and a vent opening, and a hollow screw-type base, and a liquid level indicator supported in the central opening in the cap and having an upper portion and a lower portion, said upper portion including an indicator stem projecting through said central opening and an enlarged hollow section at the lower end, said lower portion including a hollow tubular member having one end inserted into said hollow section and the other end closed to define a sealed chamber, and means in said cap for limiting the upward movement of the indicator to a height less than the height of the battery cables, said limiting means located in the bottom of said base to act as a splash guard and to define a vent passage in the inside wall of said base.

* * * * *

UNITED STATES PATENT AND TRADEMARK OFFICE
CERTIFICATE OF CORRECTION

PATENT NO. : 4,184,011
DATED : January 15, 1980
INVENTOR(S) : Edward R. Straszewski It is certified that error appears in the above—identified patent and that said Letters Patent is hereby corrected as shown below:

FRONT PAGE OF PATENT:

In the Heading: Delete "Strazewski", insert --Straszewski--

Line 2: Delete "Strazewski", insert --Straszewski--

IN THE DESCRIPTION:

Column 1, line 56: Delete "bttery", insert --battery--

Column 2, line : Delete "slots", insert --fits--

Signed and Sealed this

Twenty-second Day of July 1980

[SEAL]

Attest:

SIDNEY A. DIAMOND

Attesting Officer     Commissioner of Patents and Trademarks